Jan. 19, 1937.	H. TETRAULT	2,067,954
WRECKING CRANE
Filed May 13, 1935	4 Sheets-Sheet 1

Inventor
Hector Tetrault.

By Lacey&Lacey, Attorneys

Jan. 19, 1937.  H. TETRAULT  2,067,954
WRECKING CRANE
Filed May 13, 1935  4 Sheets-Sheet 3

Inventor
Hector Tetrault
By Lacey & Lacey, Attorneys

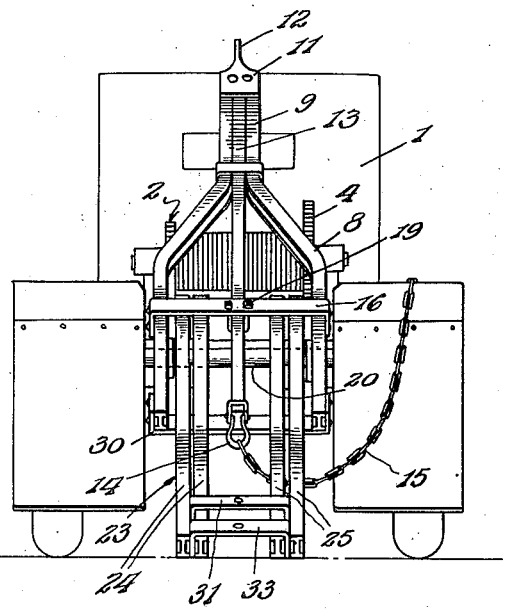
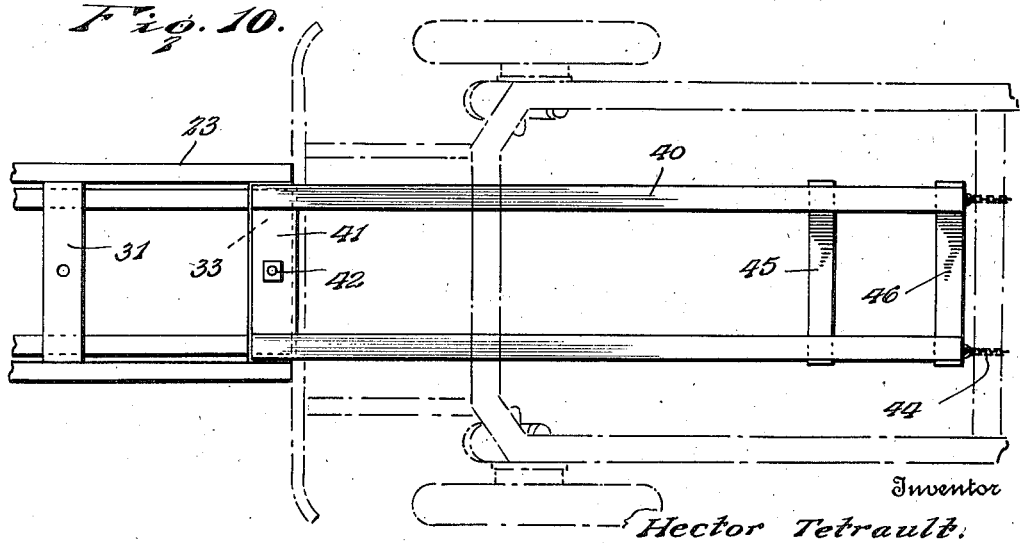

Patented Jan. 19, 1937

2,067,954

UNITED STATES PATENT OFFICE 2,067,954

WRECKING CRANE

Hector Tetrault, Bourbonnais, Ill.

Application May 13, 1935, Serial No. 21,270

7 Claims. (Cl. 214—86)

This invention relates to an improved wrecking crane and seeks, among other objects, to provide a device of this character which may be readily employed for raising the front or rear of a passenger motor vehicle or truck so that such vehicle may be readily towed.

Another object of the invention is to provide a wrecking crane which is of such construction that the use of ropes or chains may be dispensed with and danger of marring the finish or straining the tie bars of the vehicle being towed, eliminated.

A further object of the invention is to provide a wrecking crane wherein a frame may be directly engaged with the front axle of the vehicle to be towed so that the use of tie bars for maintaining the towing and towed vehicles at the desired distance apart, will not be required.

Another object of the invention is to provide a wrecking crane wherein means is employed for anchoring the truck to the ground when it is necessary to employ a winch for raising a vehicle out of a ditch.

A further object of the invention is to provide a device of this character which has associated therewith an adapter for use with vehicles of the independently suspended front wheel type.

And the invention has as a still further object to provide a wrecking crane which may be operated with ease and efficiency and which, when not in use, may be shifted to occupy a minimum amount of space.

A reading of the specification will disclose other objects not hereinbefore discussed.

My invention is illustrated in the several sheets of accompanying drawings wherein:

Figure 5 is an enlarged fragmentary horizontal sectional view on the line 5—5 of Figure 3, looking in the direction indicated by the arrows.

Figure 6 is an enlarged fragmentary horizontal sectional view on the line 6—6 of Figure 3, looking in the direction indicated by the arrows.

Figure 7 is an enlarged horizontal sectional view on the line 7—7 of Figure 1, looking in the direction indicated by the arrows.

Figure 8 is an enlarged longitudinal sectional view of the ground hook employed.

Figure 9 is a rear elevation of the device with the frame lowered to operative position.

Figure 10 is a top plan view showing the adapter employed as it would appear in place beneath a vehicle, the vehicle being shown in dotted lines and the lower end of the frame being fragmentarily shown.

Figure 1:
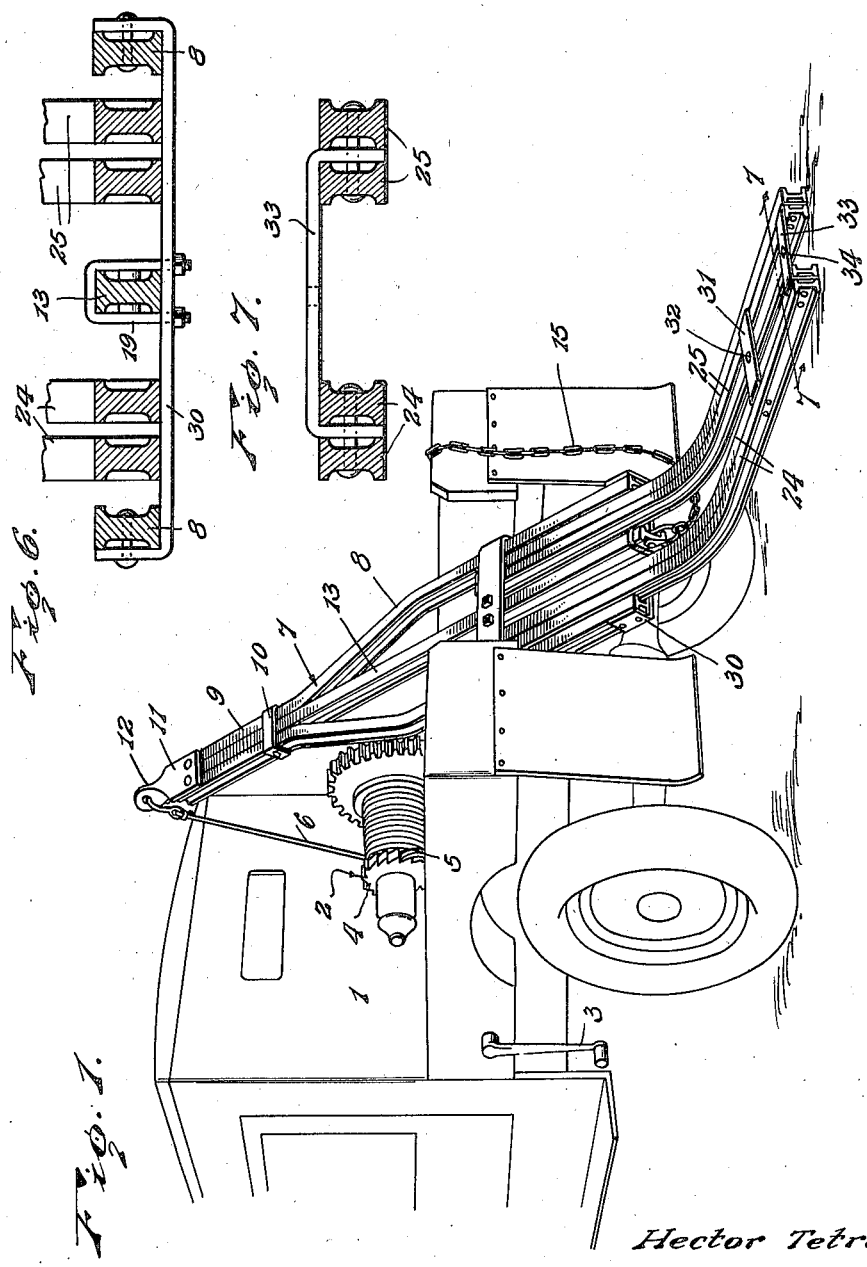
Figure 1 is a perspective view showing the device as it would appear lowered, ready for insertion beneath the axle of a vehicle to be towed.

Referring now more particularly to the accompanying drawings, wherein like numerals of reference designate like parts throughout the several views, the numeral 1 indicates in general a motor vehicle which is of conventional form. A winch 2 is mounted on the rear deck of the vehicle centrally thereof and slightly forwardly of the rear axle thereabove. The winch is preferably manually driven by suitable transmission means connected to a crank 3. If desired, suitable connection may be made to the rear axle for taking power from the motor for operating the winch. However, the crank 3 is of such length that a sufficient amount of leverage will be provided in order that the winch may be operated with a minimum amount of effort. A ratchet wheel 4 is carried on the winch and is engageable by a pawl 5 which is adapted to retain the drum of the winch in any desired position. A cable 6 is normally wound about the drum and, of course, said cable may be unwound to the length necessary for the individual job.

Figure 3:
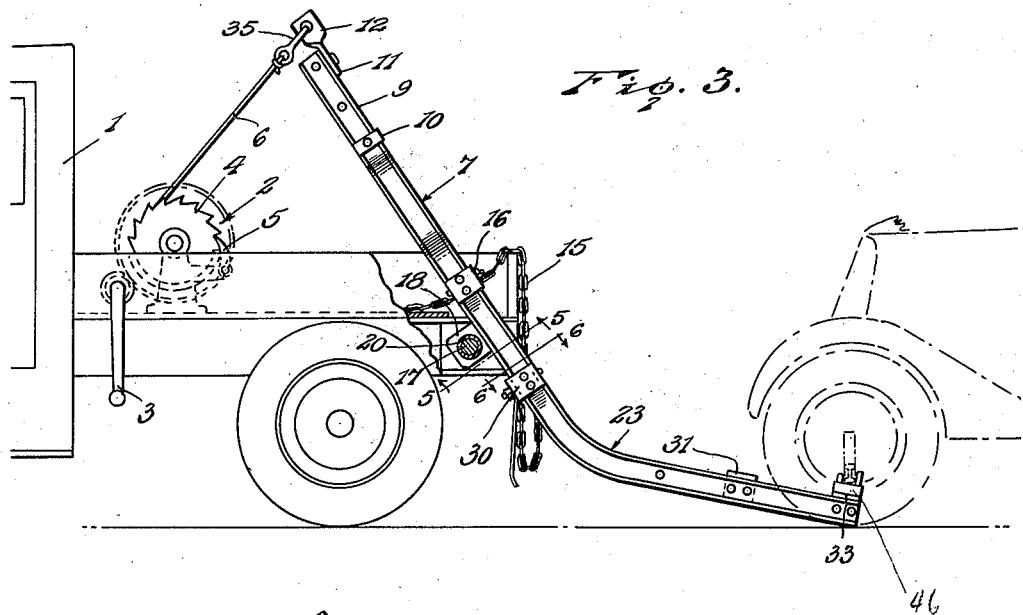
Figure 3 is a side elevation partly shown in section and illustrating the device as it would appear in engagement with a vehicle preliminary to raising the vehicle for a towing operation.

Associated with the vehicle body at its rear end medially of its width and normally disposed in angular relation to said vehicle, is a frame which is indicated in general by the numeral 7. The frame includes a pair of beams 8 which are disposed in close parallel spaced relation to each other at their upper end portions, as indicated at 9, and are held in place by means of a clamp 10. An end plate 11 engages and secures the beams 8 at their upper extremities. As best seen in Figures 1 and 3 of the drawings, the plate 11 extends past the ends of the beams 8 and is bent to right angular relation and apertured to define a loop 12. The purpose of the loop will be described hereinafter. The beams 8, downwardly of the clamp 10, diverge or are bent obliquely, outwardly and are then bent downwardly to lie in a parallel plane at each side of the rear portion of the vehicle. The beams 8 straddle a central or intermediate beam 13 which is of the same shape and substantially the same length as the beams 8 and which extends throughout the length of said beams. The beam 13 is straight throughout its length and is clamped between the portions 9 of the beams 8 by means of the clamp 10 and the plate 11. A loop 14 is swingingly connected with the lower end portion of the intermediate beam 13 and is adapted to receive a chain 15 which is to be secured over the end of the truck when not in use. The chain is for general purpose work and may be used for towing, if desired. A clamping plate 16 effectually spaces the beams 8 and the beam 13 and also rigidly clamps said beams in position.

As best seen in Figure 5 of the drawings, a circular mounting bar 17 extends transversely of the vehicle at the rear thereof and is connected to the beams 8 by means of bearing plates 18. A U-shaped bolt 19 effectually secures the beam 13 in position on the clamping plate 16 between the beams 8. Spacing sleeves 20 surround the mounting bar 17. Opposite corresponding ends of the mounting bar 17 are journaled in a bearing 21 which is mounted in one of the channel members 22 of the side of the vehicle. It will thus be understood that the upper portion of the frame will be swingingly mounted but will be braced against side sway on the truck.

Figure 2:
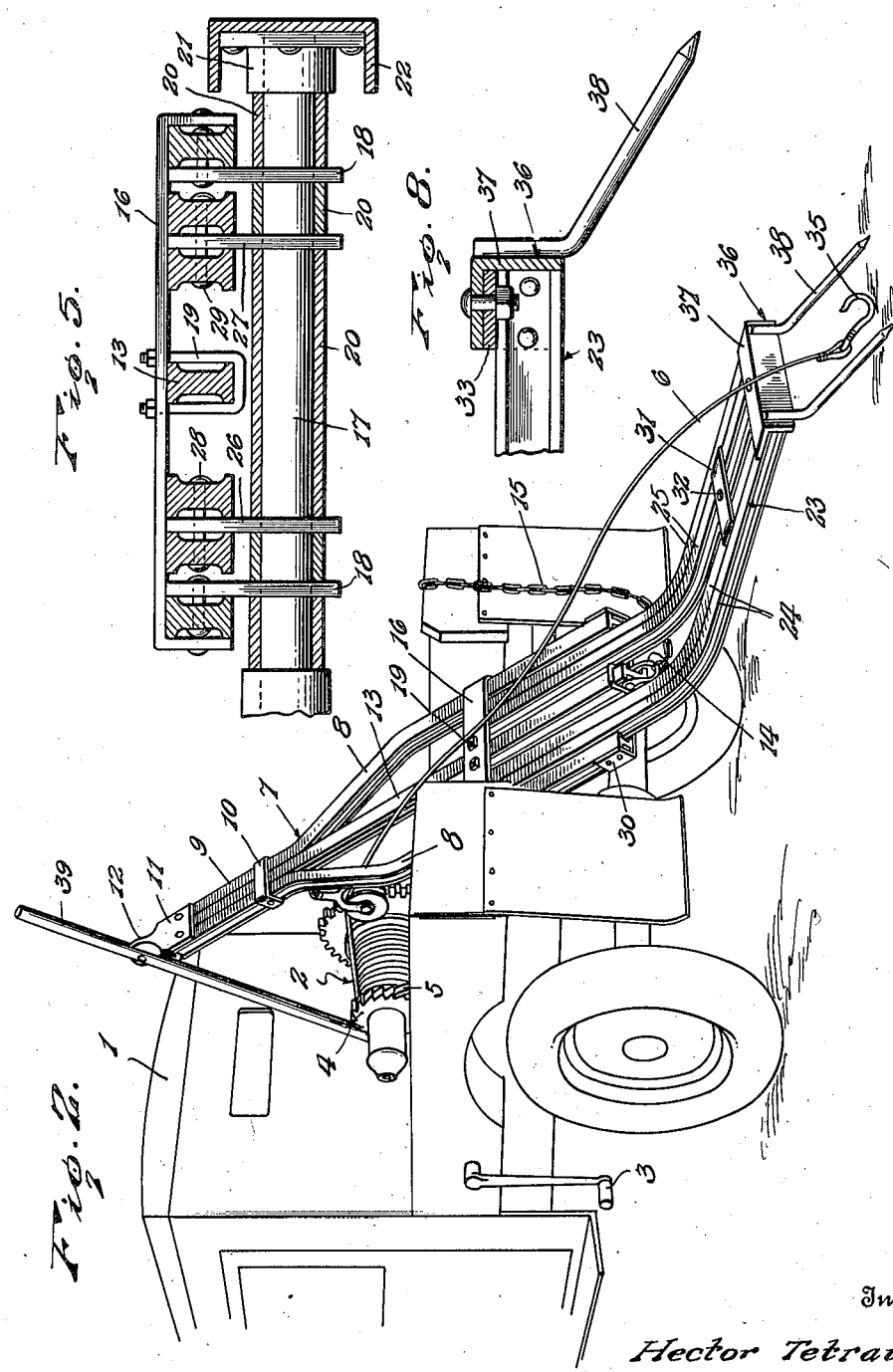
Figure 2 is a perspective view showing the device with a ground hook engaged thereon and ready for anchoring in the ground preliminary to a winching operation.
Figure 4:
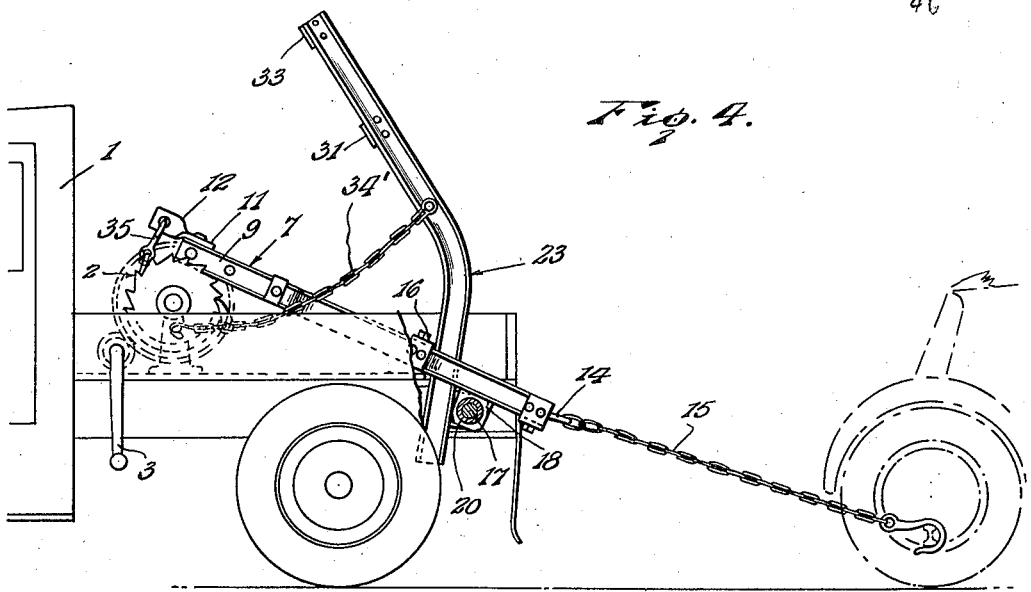
Figure 4 is a side elevation showing the device as it would appear with the lower portion of the frame thereof swung upwardly to inoperative position, the upper portion thereof having a chain engaged with the front axle of a vehicle for a towing operation.
Figure 11:
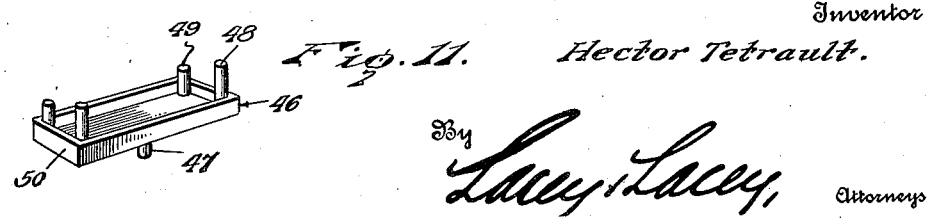
Figure 11 is an enlarged perspective view of a connecting plate for connecting and supporting an automobile axle on the device.

Associated with the upper portion and swingingly connected with the mounting bar 17 is a lower portion 23 which comprises pairs of spaced parallel beams 24 and 25. The pairs of beams 24 and 25 are bent obliquely to substantially obtuse angular formation so that the corresponding outer end portions are disposed nearly parallel with the ground or other supporting surface when the device is in use. The pairs of beams 24 and 25 are mounted on the mounting bar by means of plates 26 and 27. The plates 26 and 27 are mounted between the beams of each corresponding pair of beams and are connected thereto by bolts 28 and 29. As best seen in Figures 1 and 2 of the drawings, the corresponding inner portions of the pairs of beams 24 and 25 lie within the bounds of the lower end portions of the beams 8 and 13 therebetween. A supporting plate 30 extends between the corresponding free ends of the beams 8 therebeneath and provides a support for the beams 24 and 25. The plate 16 provides a support for the corresponding upper ends of the beams 24 and 25 so that the beams 8, 13, 24 and 25 are retained in parallel spaced relation when the device is in use. That is to say, the plates 16 and 30 limit the downward swinging movement of the lower portion 23 of the frame. Connecting the pairs of beams 24 and 25 near their corresponding end portions is a spacing plate 31 having an aperture 32 therein. The opposite end portions of the plate 31 are bent for disposition between each pair of the beams 24 and 25. Located at the corresponding free end portions of the beams 24 and 25 and having its corresponding ends clamped therebetween is a spacing plate 33 having an aperture 34 therein. The plates 31 and 33 cooperate for spacing the end portions of the pairs of beams 24 and 25 and also provide means for mounting thereon the axle of a vehicle to be towed, as will be understood from a glance at Figure 3 of the drawings, wherein a vehicle is shown in dotted lines with its axle in position between the plates 31 and 33, with a suitable chain or strap clamping the axle in place. As shown in Figure 4 of the drawings, the lower portion 23 of the frame may be swung upwardly and rearwardly and may be held in said upward position by means of a suitable chain 34'. The chain 34' extends from a point on the winch 2 to a location slightly forwardly of the curved portion of the beams 24, said chain merely serving to hold the lower portion upward out of the way when it is not desired to use said lower portion. As seen in Figure 11 of the drawings, I employ a mounting plate 46 which is rectangular in contour and is provided with a medially placed stud 47 which is adapted to engage in a medial opening in the plate 33. Relatively long studs 48 and relatively short studs 49 extend upward from corners of the plate 46 and these studs are secured to an integral upstanding flange 50. The plate and studs cooperate to permit the mounting of axles between corresponding pairs of relatively long and short studs so that the use of chains as securing means may be dispensed with, if desired.

As will be seen, the lower portion, when in upward position, will be disposed substantially at right angles to said upper portion with portions of the faces of the pairs of beams in contact with the plate 16, said plate 16 serving as a stop. When the lower portion is not being used and it is desired to tow a vehicle in a conventional manner, the chain 15, which is connected to the beam 13, may be employed. The upper end portion of the frame is swung downwardly to overlie the winch drum and is held thereon by means of a hook 35 which is secured to the cable 6. The cable and hook may be engaged with a vehicle for ordinary towing. When this is done, the lower portion is swung upwardly to a position shown in Figure 4 of the drawings, so that it will be out of the way.

When it is desired to use the winch for raising a vehicle out of a mud hole or a ditch, a ground hook, such as shown at 36, is employed. The ground hook comprises an angle shaped body 37 and spaced downwardly inclined prongs 38. The ground hook is bolted to the plate 33 with its body in overlying relation to the corresponding free ends of the beams 24 and 25. When the ground hook is in use, a locking rod 39 is secured to the end plate 11 and connects said end plate with the chassis of the vehicle 1. This rod retains the frame against swinging movement in any direction when the winch is in use. When the ground hook is in use, the vehicle is backed for engaging the prongs 38 firmly in the ground. The winch may then be put in use and the disabled vehicle quickly drawn out of the ditch or mud hole. The winch is, of course, controlled by the crank 3 and the drum of the winch may be rotated for winding as much of the cable thereon as is desired.

When it is desired to move a vehicle having independently mounted front wheels, better known as "knee action" mountings, I provide an adapter such as is shown in Figure 10 of the drawings. The adapter comprises a rectangular frame 40 which is preferably formed from heavy beams and includes, at its forward end, a mounting plate 41 adapted for engagement in overlying relation with the plate 33. A bolt 42 extends through the plates 41 and 33 for retaining the parts in position. The frame extends beneath the vehicle and chains 44, secured to the free ends of the frame 40 of the adapter, are also secured to the cross frame of the vehicle. Spacing plates are employed for connecting the beams of the adapter.

It is thought that a reading of the foregoing will render it clearly apparent that I have provided an efficient wrecking crane which may be utilized for moving vehicles from place to place and which will do so without marring the finish or mutilating certain delicate parts of said vehicle. As will be understood, the device is simple in operation and may be placed in operation with ease. Moreover, my improved wrecking crane may be employed for a number of different purposes.

Having thus described the invention, what I claim is:

1. In a wrecking crane, a towing vehicle, a frame carried thereby and having an upper portion comprising spaced beams, mounting means carried on said towing vehicle, means connecting the mounting means with said upper portion, a lower portion, means connecting the lower portion with the mounting means, said upper and lower portions being adapted for independent movement, and means on the lower portion for engagement with a vehicle to be towed, said frame being shiftable for raising the vehicle to be towed for a towing operation.

2. A wrecking crane including a towing vehicle, a frame carried thereby, a mounting bar connected with the rear of said towing vehicle, means swingingly connecting the frame with the mounting bar and having a lower portion adapted to extend beneath a vehicle to be towed, said frame having an upper portion extending forwardly above the towing vehicle, said mounting bar swingingly connecting the portions with each other and with the towing vehicle and said lower portion being shiftable on said mounting bar to overlie a portion of the rear of said towing vehicle in inoperative position, and means carried by the towing vehicle for shifting the frame on the mounting bar and raising the vehicle to be towed for a towing operation, the rear of the towing vehicle being arranged to receive said mounting bar for permitting disposition of said frame in said rear portion to project therefrom.

3. A wrecking crane including a towing vehicle, a frame carried thereby and having a lower portion adapted for engagement beneath a vehicle to be moved, a mounting bar carried on said towing vehicle at the rear end thereof, plates connecting the frame with the mounting bar, means carried by the mounting bar and limiting the frame against sidewise movement on the bar, and means for swinging the frame and raising the lower portion thereof where a vehicle to be towed on said lower portion will be raised for a towing operation, said lower portion being adapted to swing rearwardly on said mounting bar to overlie a portion of the rear of said towing vehicle in an inoperative position.

4. A wrecking crane including a towing vehicle, a frame carried thereby and having an upper portion, said upper portion comprising beams and an intermediate beam, a mounting bar rotatably mounted in the rear of the towing vehicle, plates connecting the beams with the mounting bar, means rigidly mounting the intermediate beam, spacing sleeves carried on the mounting bar and limiting said upper portion against sidewise movement, a lower portion associated with the upper portion and comprising pairs of spaced beams, said lower portion being bent obliquely substantially intermediate its length for disposing its free end portion susbtantially parallel with a supporting surface, plates carried by the upper end of said lower portion and swingingly connecting said lower portion with the mounting bar, means carried by said upper portion for limiting the swinging movement of the lower portion, means on said lower portion for permitting the anchorage of a vehicle to be towed thereon, and means carried on the towing vehicle for shifting the frame and swinging said frame and the vehicle to be towed thereon upwardly for permitting a towing operation.

5. In a wrecking crane, a towing vehicle, a frame carried thereby, said frame including an upper portion, a mounting bar carried by the towing vehicle, a lower portion associated with the upper portion and having spaced beams, said beams being bent at their corresponding central portions obliquely for disposing the corresponding lower end portions of said lower portion substantially parallel with a supporting surface, a supporting plate carried by the upper portion at its lower end and limiting swinging movement of the lower portion, means swingingly connecting the lower portion with the mounting bar, and a winch carried by the towing vehicle and adapted for swinging the frame and raising a vehicle to be towed on the lower portion for permitting a towing operation.

6. A wrecking crane including a towing vehicle, a frame carried thereby, said frame having an upper portion, a mounting bar connecting the upper portion with the towing vehicle, a lower portion mounted in swinging relation to the upper portion and adapted to swing upwardly, means swingingly connecting the lower portion with the mounting bar, said upper portion having an intermediate beam, a loop carried on the beam at its free end, flexible means carried by the loop and adapted for engagement with an object to be shifted when the lower portion is swung upwardly, a winch carried by the towing vehicle, means carried by the winch and engageable with the lower portion in its upwardly swung position for retaining said upper portion in said position, and a cable on the winch adapted for engagement with the upper portion and swinging said upper portion downwardly for raising the lower end of the intermediate beam and permitting ready attachment thereto of an object to be towed.

7. In a wrecking crane, a towing vehicle, a frame carried thereby and having a lower portion adapted for engagement with a vehicle to be moved, means pivotally connecting the frame to the rear of said towing vehicle, and means carried by the towing vehicle for rocking the frame on said first mentioned means whereby a second vehicle thereon may be raised and towed, said lower portion being shiftable rearwardly on said first mentioned means to overlie a portion of the rear of said towing vehicle in inoperative position.

HECTOR TETRAULT.